United States Patent
Panda

(10) Patent No.: US 10,235,326 B1
(45) Date of Patent: Mar. 19, 2019

(54) UNIVERSAL ASYNCHRONOUS RECEIVER/TRANSMITTER (UART) DATA PASS-THROUGH FOR VIRTUALIZED ENVIRONMENTS

(71) Applicant: Juniper Networks, Inc., Sunnyvale, CA (US)

(72) Inventor: Pravas Kumar Panda, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 2 days.

(21) Appl. No.: 15/695,717

(22) Filed: Sep. 5, 2017

(51) Int. Cl.
    G06F 13/42 (2006.01)
    G06F 13/40 (2006.01)
    G06F 9/455 (2018.01)

(52) U.S. Cl.
    CPC ...... *G06F 13/4286* (2013.01); *G06F 9/45558* (2013.01); *G06F 13/404* (2013.01); *G06F 2009/45579* (2013.01); *G06F 2009/45595* (2013.01)

(58) Field of Classification Search
    CPC combination set(s) only.
    See application file for complete search history.

(56) References Cited

U.S. PATENT DOCUMENTS

| 7,613,847 B2 | 11/2009 | Kjos et al. |
| 7,730,248 B2 | 6/2010 | Goss et al. |
| 2013/0031568 A1 | 1/2013 | Tamir et al. |

*Primary Examiner* — Henry Tsai
*Assistant Examiner* — Juanito Borromeo
(74) *Attorney, Agent, or Firm* — Harrity & Harrity, LLP

(57) ABSTRACT

A hypervisor of a device may receive information that identifies a virtual machine that is to use a universal asynchronous receiver/transmitter (UART) of the device. The hypervisor may map a set of first register addresses, associated with a physical UART port, and a set of variable addresses. The hypervisor may map a second set of register addresses, associated with a virtual UART port of the virtual machine, and the set of variable addresses. The hypervisor may permit the virtual machine to communicate, with a remote device, using the physical UART port based on mapping the set of second register addresses and the set of variable addresses.

20 Claims, 7 Drawing Sheets

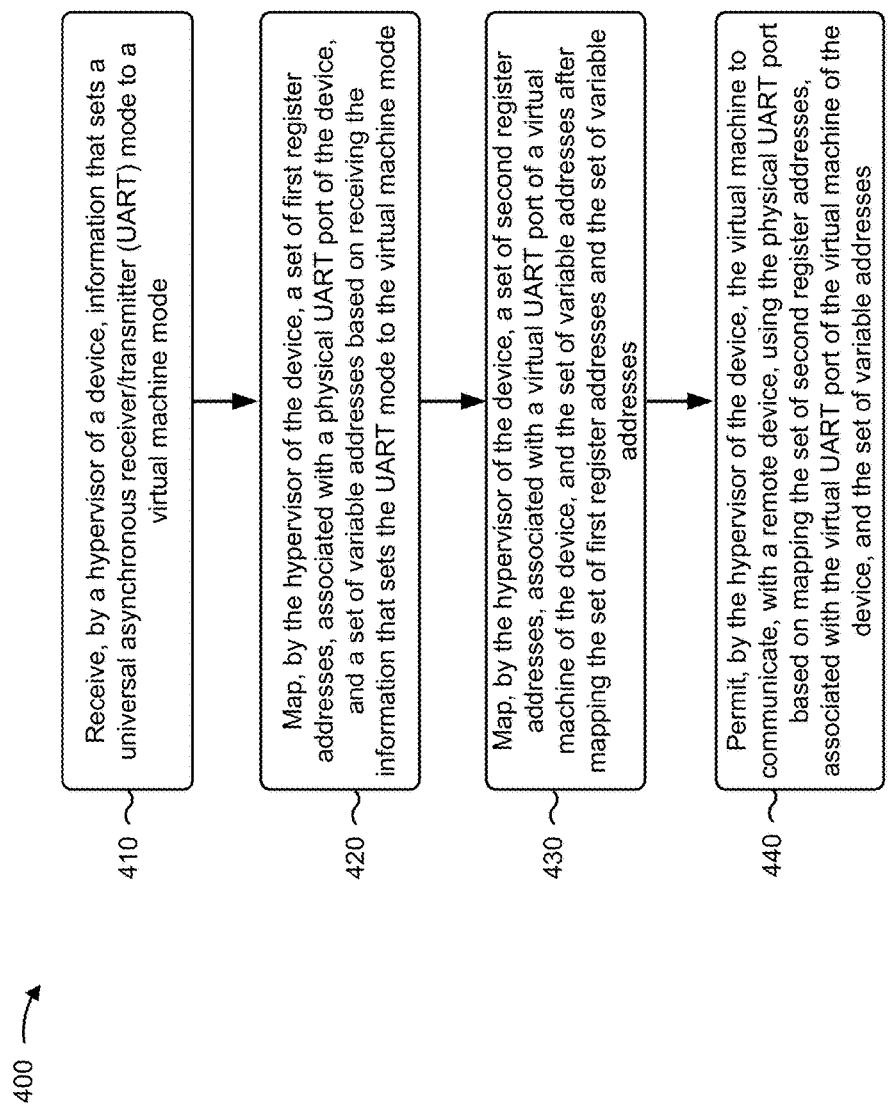

UNIVERSAL ASYNCHRONOUS RECEIVER/TRANSMITTER (UART) DATA PASS-THROUGH FOR VIRTUALIZED ENVIRONMENTS

BACKGROUND

A universal asynchronous receiver/transmitter (UART) is a computer hardware device for asynchronous serial communication in which data format and transmission speeds are configurable. Additionally, a UART is an integrated circuit used for serial communications over a computer or peripheral device serial port. A UART takes bytes of data and transmits individual bits in a sequential fashion. At the destination, a second UART re-assembles the bits into complete bytes.

SUMMARY

According to some possible implementations, a device may include one or more processors to receive, by a hypervisor of the device, information that sets a universal asynchronous receiver/transmitter (UART) mode to a virtual machine mode; map, by the hypervisor of the device, a set of first register addresses, associated with a physical UART port of the device, and a set of variable addresses that is associated with a set of variables, based on receiving the information that sets the UART mode to the virtual machine mode; map, by the hypervisor of the device, a set of second register addresses, associated with a virtual UART port of a virtual machine of the device, and the set of variable addresses after mapping the set of first register addresses and the set of variable addresses; and permit, by the hypervisor of the device, the virtual machine to communicate, with a remote device, using the physical UART port based on mapping the set of second register addresses and the set of variable addresses.

According to some possible implementations, a non-transitory computer-readable medium may store one or more instructions that, when executed by one or more processors of a device, cause the one or more processors to receive, by a hypervisor of the device, information that identifies that a virtual machine of the device is to use an asynchronous receiver/transmitter (UART) of the device; map, by the hypervisor of the device, a set of first register addresses, associated with a physical UART port of the device, and a set of variable addresses that is associated with a set of variables based on receiving the information that identifies that the virtual machine is to use the UART of the device; map, by the hypervisor of the device, a set of second register addresses, associated with a virtual UART port of the virtual machine of the device, and the set of variable addresses after mapping the set of first register addresses and the set of variable addresses; and permit, by the hypervisor of the device, the virtual machine to communicate, with a remote device, using the physical UART port based on mapping the set of second register addresses and the set of variable addresses.

According to some possible implementations, a method may include receiving, by a hypervisor of a device, information that identifies that a virtual machine of the device is to use a universal asynchronous receiver/transmitter (UART) of the device; mapping, by the hypervisor of the device, a set of first register addresses, associated with a physical UART port of the device, and a set of variable addresses that is associated with a set of variables, based on receiving the information that identifies that the virtual machine is to use the UART of the device; mapping, by the hypervisor of the device, a set of second register addresses, associated with a virtual UART port of the virtual machine of the device, and the set of variable addresses after mapping the set of first register addresses and the set of variable addresses; and permitting, by the hypervisor of the device, the virtual machine to communicate, with a remote device, using the physical UART port based on mapping the set of second register addresses and the set of variable addresses.

BRIEF DESCRIPTION OF THE DRAWINGS

FIG. 4 is a flow chart of an example process for enabling a virtual machine to communicate, with a remote device, using a physical universal asynchronous receiver/transmitter port of a host device.

DETAILED DESCRIPTION

Figure 1A:
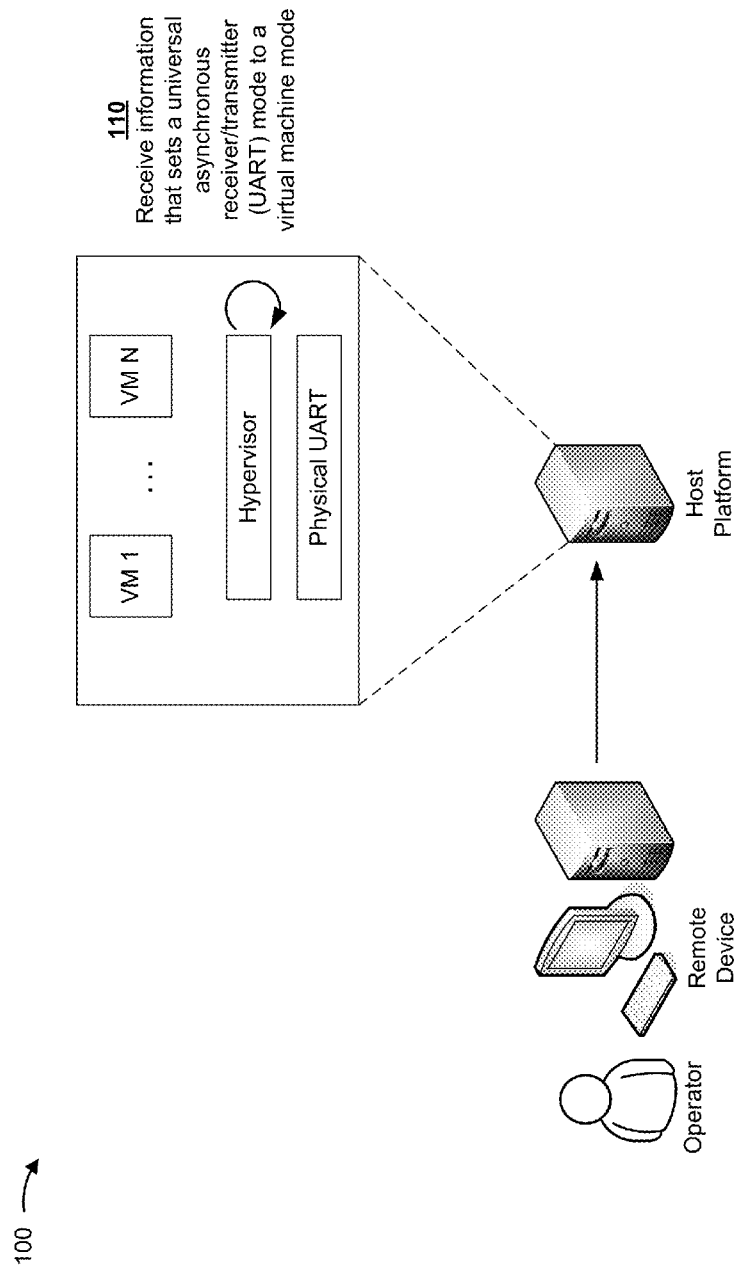
FIGS. 1A-1D are diagrams of an overview of an example implementation described herein.

The following detailed description of example implementations refers to the accompanying drawings. The same reference numbers in different drawings may identify the same or similar elements.

In virtualized computing environments, a hypervisor of a host device can use a UART to communicate with remote devices. The hypervisor can communicate with the UART using a set of registers. A register can refer to a portion of memory, of the host device, that is accessible by the hypervisor, and is associated with an input/output (I/O) address. The hypervisor can write to and/or read from a register using the I/O address of the register.

The hypervisor can utilize a set of registers to communicate, with remote devices, using the UART. As an example, the hypervisor can read from a receiver buffer register (RBR), using an I/O address of the RBR, to receive data from another device. As another example, the hypervisor can write to a transmitter holding register (THR), using an I/O address of the THR, to transmit data to another device.

The hypervisor can utilize another set of registers to determine various states of the UART. For example, the hypervisor can read from a line status register (LSR), using an I/O address of the LSR, to determine states of the RBR and/or the THR (e.g., data received, data sent, and/or the like), identify communication errors, and/or the like. As another example, the hypervisor can read from a modem status register (MSR), using an I/O address of the MSR, to determine a connection status with a remote device with which the host device is communicating.

Further, the hypervisor can utilize another set of registers to configure interrupt settings. For example, the hypervisor can write to an interrupt enable register (IER), using an I/O address of the IER, to configure interrupt settings with the UART. An interrupt can refer to a signal, that is emitted by the UART, that identifies a particular event. As examples, a received data available interrupt can identify an event associated with the RBR (e.g., that data has been received), a THR empty interrupt can identify an event associated with the THR (e.g., that outgoing data has been transmitted), a receiver line status interrupt can identify an event associated with the LSR (e.g., that a communication error has occurred), and a modem status interrupt can identify an event associated with the MSR (e.g., that a connection with another UART has failed).

The hypervisor can read from an interrupt identification register (IIR), using an I/O address of the IIR, to identify an underlying event that caused the UART to generate the interrupt. By using interrupts, the hypervisor can refrain from periodically polling the registers to identify underlying events.

In some cases, a capability of a virtual machine (VM), that is being executed by the host device, to use a UART can be desirable. For example, a network operator might desire to perform, using a remote device, remote debugging of a VM using a physical UART port of a host device that is executing the VM (e.g., send debugging commands to the VM, identify outputs of the VM based on the commands, and/or the like). A console cable might connect a physical UART port of a remote device and a physical UART port of a host device. In this case, the network operator might desire to use the remote device to perform remote debugging of the VM after establishing a connection between the physical UART port of the remote device and the physical UART port of the host device.

However, both the hypervisor and the VM of the host device might process data that is received from the remote device via the physical UART port of the host device. For example, the hypervisor might copy data that is received via the RBR, and provide the data to the VM. However, if the hypervisor processes the data that is received via the RBR, then remote debugging might become impractical. As an example, assume that a network operator interacts with a remote device to send a debugging command that instructs the VM to perform a reboot. In this case, the hypervisor might process the command and perform a reboot, thereby preventing the intended command from being performed and/or rendering remote debugging impractical.

Additionally, both the hypervisor and the VM might output, using the THR, debugging messages that might be received by the remote device. As such, the network operator might not be capable of distinguishing whether the debugging messages were generated by the hypervisor or the VM. As such, remote debugging of a VM using a physical UART port of a host device might result in host device operation errors, might be impractical, might be inefficient, might be error-prone, etc. in situations where the hypervisor and a VM of the host device are concurrently using the physical UART port.

In other cases, the hypervisor of the host device might process interrupts that are generated by the UART. Additionally, a VM might not receive an interrupt that is generated by the UART, and thereby might not identify an underlying event that caused the UART to generate the interrupt. In situations where a VM supports a log-out-on-disconnect feature, a network operator might expect the VM to log out of a session when a console cable is removed from the host device. However, if an MSR interrupt is not provided to the VM, then the VM might not detect that the console cable is removed from the host device. In such cases, a malicious entity might disconnect a console cable from the host device, connect another console to the host device, and gain access to the VM. As such, the inability of the VM to receive interrupts might compromise VM security, might result in device operation errors, and/or the like.

Some implementations described herein provide a hypervisor, of a host device, that can permit a VM of the host device to communicate, using a physical UART port of the host device, with a remote device. For example, the hypervisor of the host device can operate in a mode whereby the hypervisor refrains from processing data that is received via the physical UART port, and provides the data to a VM (e.g., without having processed the data). Additionally, the hypervisor can provide interrupts, that were generated by the UART, to a VM. In this way, some implementations described herein permit remote debugging of a VM using a physical UART port of a host device, permit a VM to receive interrupts that were generated by a UART of the host device, and/or the like.

Some implementations described herein reduce device operation errors, reduce an amount of manual configuration of devices, improve security of VMs, and/or the like. Thereby, some implementations described herein conserve processor and/or memory resources of devices associated with virtualized computing environments.

While some implementations herein describe a UART, it should be understood that implementations herein are applicable to other types of legacy devices that might not support virtualization.

FIGS. 1A-1D are diagrams of an overview of an example implementation 100 described herein. As shown in FIGS. 1A-1D, example implementation 100 may include a host platform and a remote device that may be connected to the host platform by a console cable. For example, the console cable may connect a physical UART port of the remote device and a physical UART port of the host platform. Assume that an operator of the remote device wishes to perform remote debugging, via the remote device, of a virtual machine of the host platform.

As shown in FIG. 1A, the host platform is running a set of virtual machines (e.g., VM 1 through VM P). The virtual machine(s) may include a software implementation of a machine (e.g., a computer) that executes programs like a physical machine. As further shown in FIG. 1A, the host platform is running a hypervisor. The hypervisor may provide hardware virtualization techniques that allow multiple operating systems to execute concurrently on the host platform. As further shown in FIG. 1A, the host platform may include a physical UART that includes a physical UART port that permits communication with other serial data ports.

As used herein, a physical UART may refer to a UART of the host platform that is associated with a physical UART port of the host platform. Additionally, as used herein, a virtual UART may refer to a UART that is associated with virtual UART port of a virtual machine.

As further shown in FIG. 1A, and by reference number 110, the host platform (e.g., the hypervisor) may receive information that sets a UART mode to a virtual machine mode. In some implementations, the virtual machine mode may permit a virtual machine of the host platform to communicate with the remote device via a physical UART port of the host platform. In the virtual machine mode, the host platform may prevent data, that is received from the remote device and via the physical UART port, from being processed by the hypervisor. Additionally, or alternatively, in the virtual machine mode, the host platform may allow the hypervisor to provide, to a virtual machine, information associated with interrupts that are generated by the physical UART. In some implementations, the hypervisor may set the UART mode to a virtual machine mode based on receiving an instruction from the remote device, based on a configuration, based on performing a reboot, and/or the like.

Figure 1B:
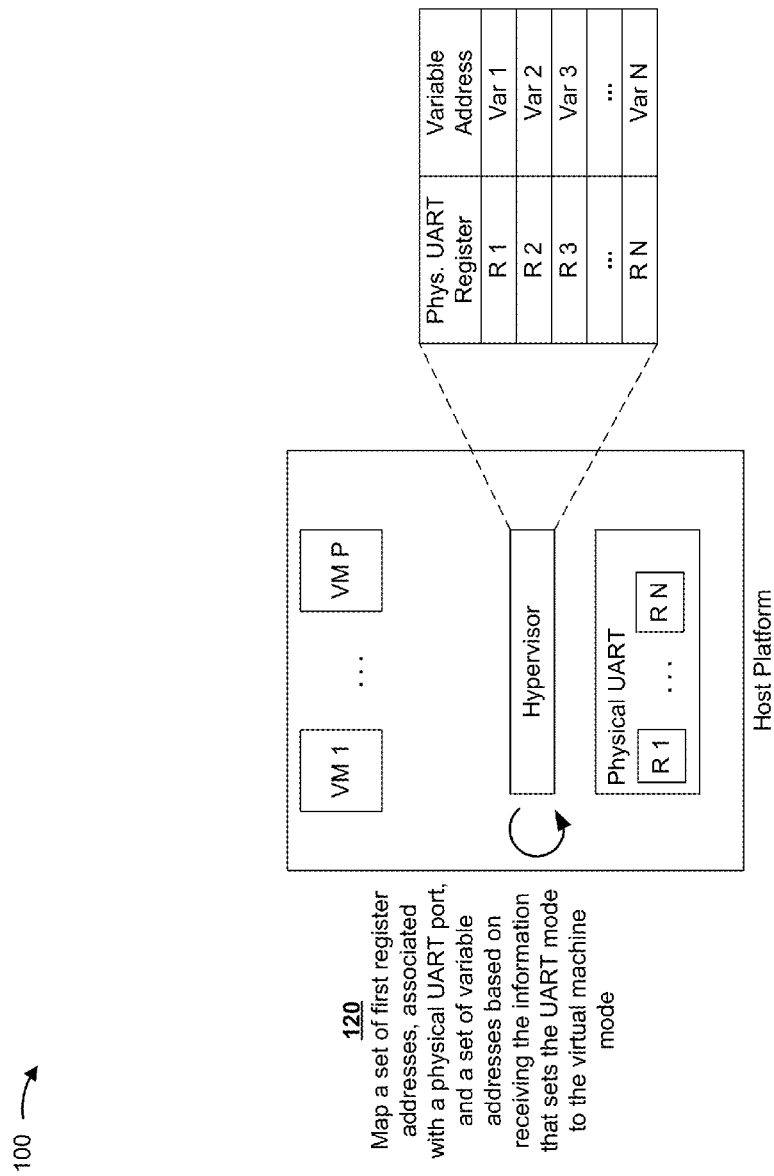

As shown in FIG. 1B, and by reference number 120, the host platform (e.g., the hypervisor) may map a set of first register addresses, associated with a physical UART port, and a set of variable addresses based on receiving the information that sets the UART mode to the virtual machine mode.

In some implementations, the set of first register addresses may correspond to a set of physical registers of the host platform (e.g., R 1 through R N). For example, the physical registers may include an RBR, THR, IER, IIR, MSR, LSR, and/or the like. As used herein, a physical register may refer to a register that is associated with a physical UART.

In some implementations, the set of variable addresses may correspond to a set of variables, such as pseudo file system variables, file system variables, and/or the like (e.g., Var 1 through Var N). As shown, the host platform may utilize a data structure (e.g., a table) that stores mapping information that maps the set of first register addresses and the set of variable addresses.

Figure 1C:
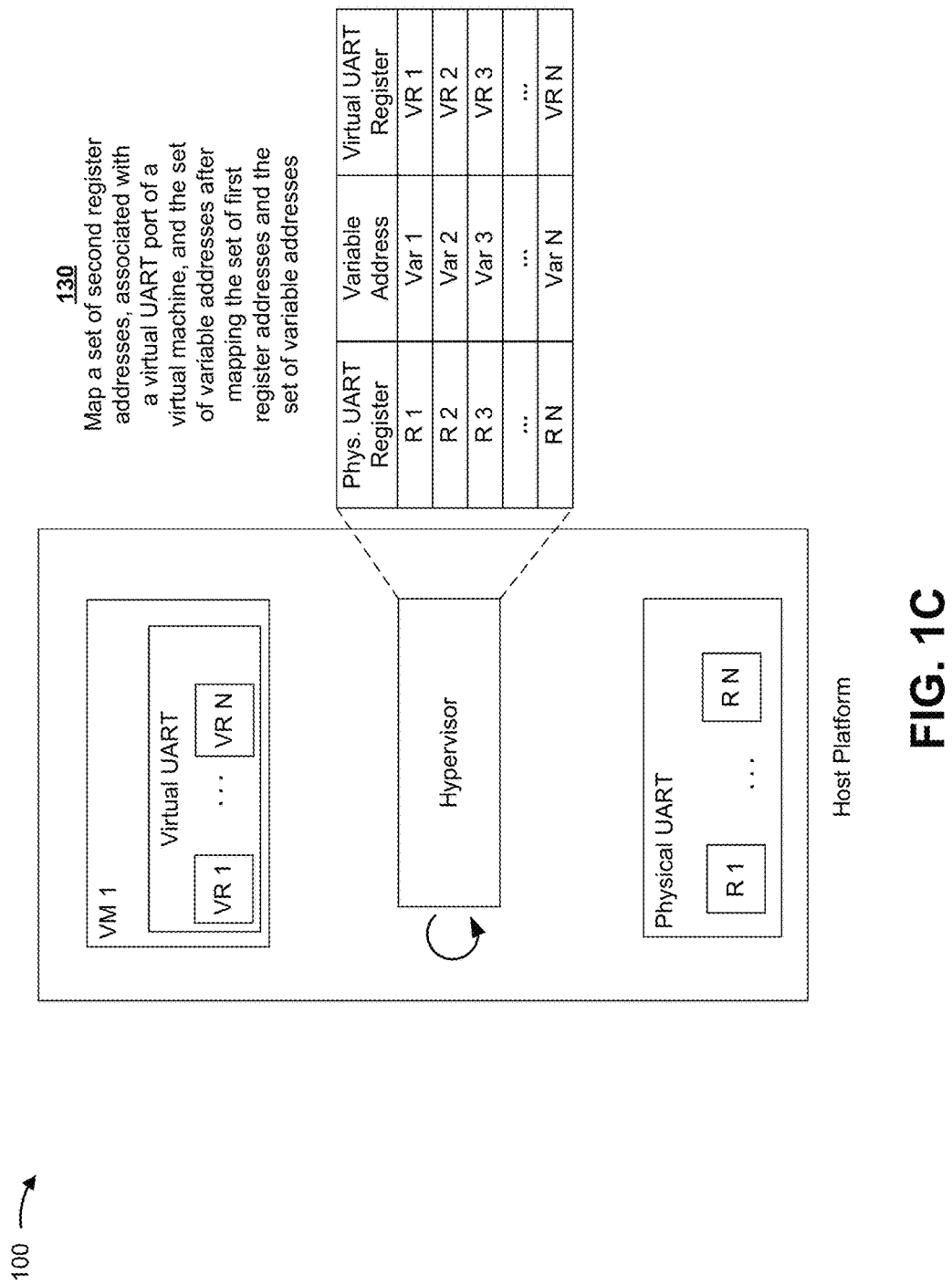

As shown in FIG. 1C, and by reference number 130, the host platform (e.g., hypervisor) may map a set of second register addresses, associated with a virtual UART port of a virtual machine, and the set of variable addresses after mapping the set of first register addresses and the set of variable addresses. For example, a virtual machine (e.g., VM 1) of the host platform may include a virtual UART. Additionally, the virtual UART may include a set of virtual registers (e.g., VR 1 through VR N). As used herein, a virtual register may refer to a register that is associated with a virtual UART. In some implementations, the set of virtual registers may include a same number of registers as a number of registers of the set of physical registers. Alternatively, the set of virtual registers may include a greater number or fewer number of registers than as compared to the set of physical registers.

In some implementations, the virtual registers may correspond to physical registers of the physical UART (e.g., a THR, an RBR, an MSR, and/or the like). In some implementations, the hypervisor may store mapping information that maps register addresses of virtual registers and variable addresses of variables.

Figure 1D:
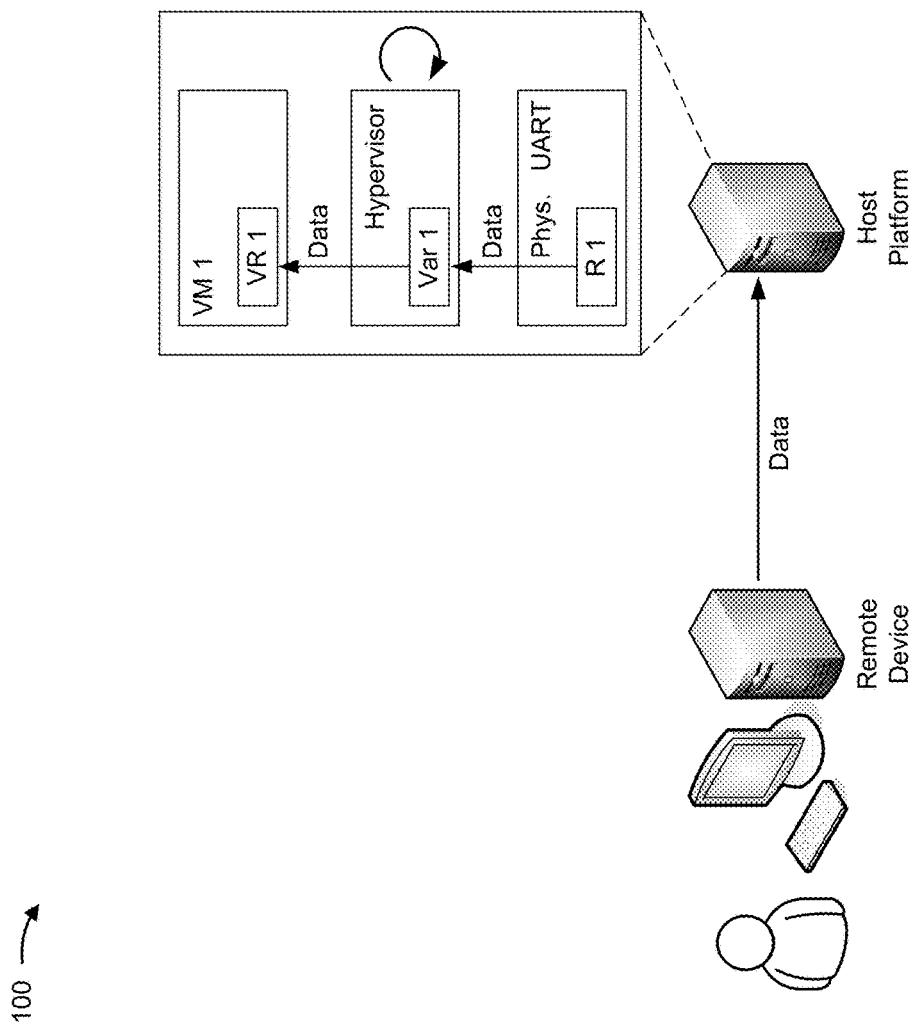

As shown in FIG. 1D, and by reference number 140, the host platform (e.g., the hypervisor) may permit the virtual machine to communicate, with a remote device, using the physical UART port based on mapping the set of second register addresses, associated with the virtual UART port of the virtual machine, and the set of variable addresses.

As an example, assume that the host platform receives data from the remote device. In this case, the RBR (e.g., R 1) of the physical UART may receive the data. Additionally, the hypervisor may read the data from the RBR, and determine, using mapping information, that the register address of the RBR is mapped to a variable address of a variable (e.g., Var 1). Additionally, the hypervisor may write the data to the variable. In some implementations, the virtual machine may read the data from the variable. Alternatively, the hypervisor may write the data to a virtual RBR (e.g., VR 1) of the virtual machine. In either case, the virtual machine may receive the data.

In this way, some implementations described herein permit remote debugging of a virtual machine using a physical UART port of a host device. For example, assume that the data shown in FIG. 1D corresponds to a remote debugging command. By permitting pass-through of the data to the virtual machine, the hypervisor may permit the remote debugging command to be processed by the virtual machine. Additionally, by preventing the hypervisor from processing the data, the hypervisor can reduce a number of situations associated with device operation errors, such as the situation where the remote debugging command corresponds to an instruction to perform a reboot.

While a particular example of data pass-through is described in connection with FIG. 1D, it should be understood that implementations described herein are applicable to other types of data pass-through involving other physical registers and virtual registers.

As indicated above, FIGS. 1A-1D are provided merely as an example. Other examples are possible and may differ from what was described with regard to FIGS. 1A-1D.

Figure 2:
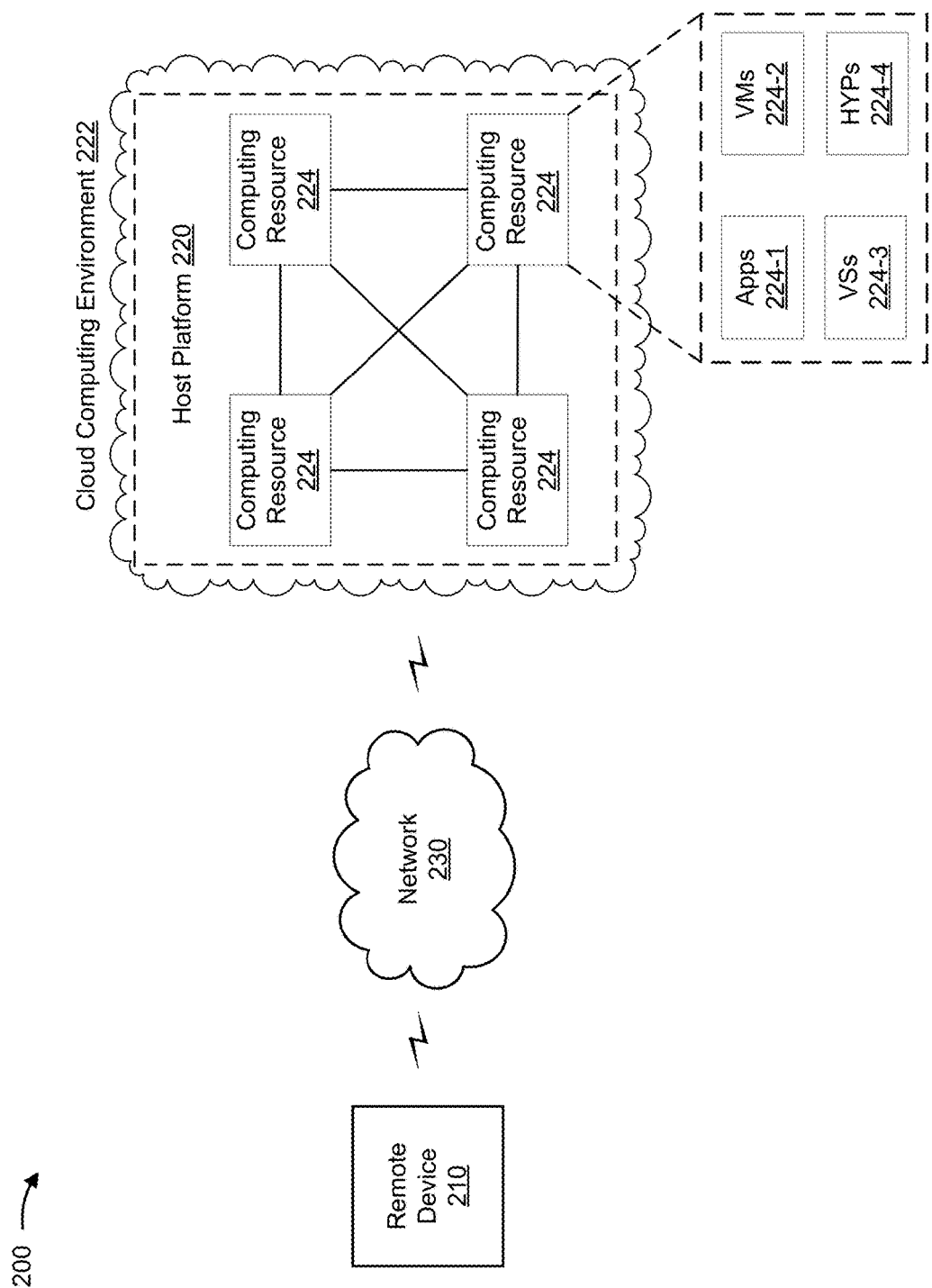
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a remote device 210, a host platform 220, and a network 230. Devices of environment 200 may interconnect via wired connections, wireless connections, or a combination of wired and wireless connections.

Remote device 210 includes one or more devices capable of receiving, generating, storing, processing, and/or providing information using a UART. For example, remote device 210 may include a device, such as a server device, a network device, a mobile phone (e.g., a smart phone, a radiotelephone, etc.), a laptop computer, a tablet computer, a handheld computer, or a similar type of device.

Host platform 220 includes one or more devices capable of receiving, generating, storing, processing, and/or providing information using a UART. In some implementations, host platform 220 may be designed to be modular such that certain software components may be swapped in or out depending on a particular need. As such, host platform 220 may be easily and/or quickly reconfigured for different uses.

In some implementations, as shown, host platform 220 may be hosted in cloud computing environment 222. Notably, while implementations described herein describe host platform 220 as being hosted in cloud computing environment 222, in some implementations, host platform 220 might not be cloud-based (i.e., may be implemented outside of a cloud computing environment) or may be partially cloud-based.

Cloud computing environment 222 includes an environment that hosts host platform 220. Cloud computing environment 222 may provide computation, software, data access, storage, etc. services that do not require end-user (e.g., remote device 210) knowledge of a physical location and configuration of system(s) and/or device(s) that hosts host platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, one or more computing resources 224 may host host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by remote device 210. Application 224-1 may eliminate a need to install and execute the software applications on remote devices 210. For example, application 224-1 may include software associated with host platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user, and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
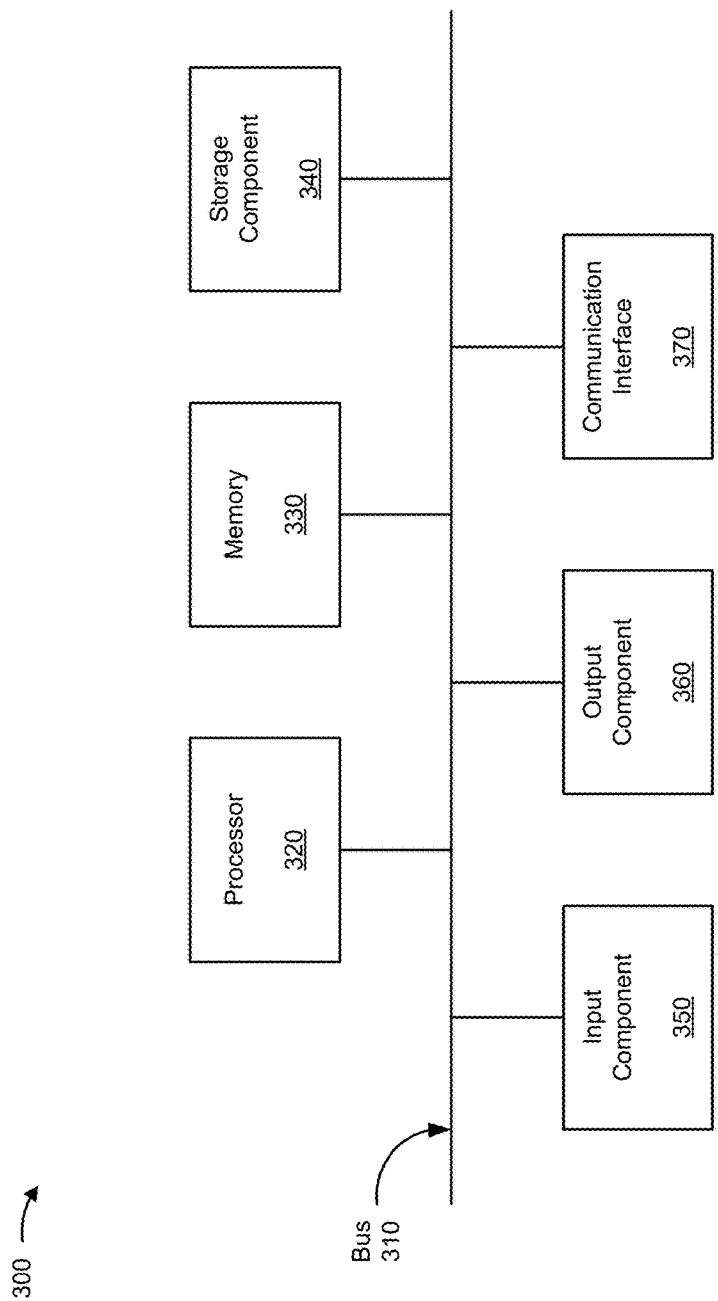
FIG. 3 is a diagram of example components of one or more devices of FIG. 2.

FIG. 3 is a diagram of example components of a device 300. Device 300 may correspond to remote device 210, host platform 220, and/or computing resource 224. In some implementations, remote device 210, host platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for enabling a virtual machine to communicate, with a remote device, using a physical universal asynchronous receiver/transmitter port of a host device. In some implementations, one or more process blocks of FIG. 4 may be performed by host platform 220. In some implementations, one or more process blocks of FIG. 4 may be performed by another device or a group of devices separate from or including host platform 220, such as remote device 210.

As shown in FIG. 4, process 400 may include receiving, by a hypervisor of a device, information that sets a universal asynchronous receiver/transmitter (UART) mode to a virtual machine mode (block 410). For example, hypervisor 224-4 may receive information that causes hypervisor 224-4 to set a UART mode to a virtual machine mode that permits virtual machine 224-2 to communicate, with remote device 210, using a physical UART port of host platform 220.

In some implementations, a UART mode may refer to a mode of operation whereby either hypervisor 224-4 of host platform 220 or a virtual machine 224-2 of host platform 220 is to use a physical UART port of host platform 220 to communicate with remote device 210. In some implementations, and in situations where the UART mode is set to a hypervisor mode, hypervisor 224-4 may use the physical UART port of host platform 220 to communicate with remote device 210. In some implementations, and in situations where the UART mode is set to the virtual machine mode, a particular virtual machine 224-2 of host platform 220 may use the physical UART port of host platform 220 to communicate with remote device 210.

In some implementations, hypervisor 224-4 may receive information that causes hypervisor 224-4 to operate in a particular UART mode. For example, hypervisor 224-4 may receive an instruction from remote device 210, may be configured to operate in a particular UART mode, may receive a configuration file, may receive a message, may receive information based on host platform 220 being powered-on, and/or the like. Additionally, or alternatively, hypervisor 224-4 may set a UART mode based on an event, such as a reboot, a hardware failure, a software failure, a change in connection status with remote device 210, a change in connection status of a console cable, and/or the like.

In some implementations, hypervisor 224-4 may receive information that identifies a particular virtual machine 224-2 that is to use the physical UART port of host platform 220 to communicate with remote device 210. For example, host platform 220 may execute a set of virtual machines 224-2, and hypervisor 224-4 may receive information that identifies that a particular virtual machine 224-2, of the set of virtual machines 224-2, is to use the physical UART port of host platform 220. In this case, hypervisor 224-4 may set the UART mode to a virtual machine mode that identifies that the particular virtual machine 224-2 is to use the physical UART port of host platform 220.

In some implementations, hypervisor 224-4 may prevent data, that is received from remote device 210 and via the physical UART port, from being processed by hypervisor 224-4 when the UART mode is set to virtual machine mode. Additionally, or alternatively, hypervisor 224-4 may provide, to a particular virtual machine 224-2, information associated with interrupts that are generated by the physical UART when the UART mode is set to virtual machine mode.

In this way, hypervisor 224-4 may permit remote debugging of virtual machine(s) 224-2 of host platform 220 using a physical UART port of host platform 220 by permitting data to pass through to virtual machine 224-2 and/or preventing data from being processed by hypervisor 224-4. Additionally, in this way, hypervisor 224-4 may permit a virtual machine 224-2 of host platform 220 to receive interrupts that were generated by the physical UART of host platform 220.

In some implementations, hypervisor 224-4 may set a UART mode to a virtual machine mode, and map a set of register addresses, associated with a physical UART, and a set of variable addresses, as described below.

As further shown in FIG. 4, process 400 may include mapping, by the hypervisor of the device, a set of first register addresses, associated with a physical UART port of the device, and a set of variable addresses based on receiving the information that sets the UART mode to the virtual machine mode (block 420). For example, hypervisor 224-4 may map a set of first register addresses, associated with a physical UART port of host platform 220, and a set of variable addresses associated with a set of variables.

In some implementations, the set of first register addresses may correspond to register addresses associated with a set of physical registers that is associated with a physical UART port of host platform 220. For example, a physical UART of host platform 220 may include a receiver buffer register (RBR), a transmitter holding register (THR), an interrupt enable register (IER), an interrupt identification register (IIR), a first-in first-out (FIFO) control register (FCR), a line control register (LCR), a modem control register (MCR), a line status register (LSR), a modem status register (MSR), a scratch register (SCR), a divisor latch low byte register (DLL), a divisor latch high byte register (DLH), and/or the like. While some implementations herein describe particular registers that are associated with a UART serial data port, implementations herein are applicable to registers associated with other types of serial communication ports or other types of ports that include sets of registers.

In some implementations, the set of variable addresses may correspond to a set of variables. In some implementations, hypervisor 224-4 may generate a set of variables that corresponds to the set of physical registers associated with the physical UART port of host platform 220. In some implementations, hypervisor 224-4 may generate the set of variables based on creating a virtual machine 224-2, based on operating in virtual machine mode, based on host platform 220 being powered-on, based on an instruction from remote device 210, and/or the like. In some implementations, hypervisor 224-4 may generate a set of variables in a pseudo file system, a synthetic file system, and/or the like. For example, hypervisor 224-4 may generate a set of variables in sysfs (e.g., a pseudo file system provided by Linux kernels).

In some implementations, hypervisor 224-4 may map the set of first register addresses and the set of variable addresses, and store mapping information after mapping the set of first register addresses and the set of variable addresses. In some implementations, hypervisor 224-4 may use the mapping information to update a variable based on data that is received via a physical register. For example, host platform 220 may receive data from remote device 210, and update a physical register based on receiving the data (e.g., update an RBR). Additionally, hypervisor 224-4 may read the data from the RBR, and update a corresponding variable using mapping information.

In some implementations, hypervisor 224-4 may use the mapping information to update a register based on an update to a variable. For example, virtual machine 224-2 may write data to a variable. Additionally, hypervisor 224-4 may identify an update to a variable based on virtual machine 224-2 writing to the variable, and may write the data to a physical register using mapping information.

In this way, and as described below, hypervisor 224-4 may map a set of second register addresses, associated with a virtual UART port of a virtual machine 224-2, and the set of variable addresses to permit the virtual machine 224-2 to communicate with remote device 210 using the physical UART port of host platform 220.

As further shown in FIG. 4, process 400 may include mapping, by the hypervisor of the device, a set of second register addresses, associated with a virtual UART port of a virtual machine of the device, and the set of variable addresses after mapping the set of first register addresses and the set of variable addresses (block 430). For example, hypervisor 224-4 may map a set of second register addresses, associated with a virtual UART port of a virtual machine 224-2 of host platform 220, and the set of variable addresses.

In some implementations, the set of second register addresses may be associated with a virtual machine 224-2 of host platform 220. For example, the set of second register addresses may be associated with virtual registers associated with a virtual UART port of a virtual UART. In some implementations, the virtual UART may be associated with a set of virtual registers, and the set of virtual registers may be associated with the set of second register addresses. For example, the virtual UART may include virtual registers that are similar to the physical registers described above in connection with block 420 (e.g., a THR, an RBR, an LSR, an MSR, and/or the like).

In some implementations, hypervisor 224-4 may map the set of second register addresses and the set of variable addresses based on mapping the set of first register addresses and the set of variable addresses, based on creating virtual machine 224-2, based on an instruction from remote device 210, based on host platform 220 being powered-on, and/or the like.

In some implementations, hypervisor 224-4 may map the set of second register addresses and the set of variable addresses, and store mapping information after mapping the set of second register addresses and the set of variable addresses. In some implementations, the mapping information may indicate that hypervisor 224-4 is to write, to a virtual register of virtual machine 224-2, data associated with a variable.

In this way, and as described below, hypervisor 224-4 may permit a virtual machine 224-2 to communicate, with remote device 210, using the physical UART port of host platform 220 based on mapping the set of second register addresses and the set of variable addresses, and based on mapping the set of first register addresses and the set variable addresses.

As further shown in FIG. 4, process 400 may include permitting, by the hypervisor of the device, the virtual machine to communicate, with a remote device, using the physical UART port based on mapping the set of second register addresses, associated with the virtual UART port of the virtual machine of the device, and the set of variable addresses (block 440). For example, hypervisor 224-4 may permit a virtual machine 224-2 to communicate, with remote device 210, using the physical UART port of host platform 220 based on mapping the set of second register addresses and the set of variable addresses.

In some implementations, hypervisor 224-4 may permit virtual machine 224-2 to receive data from remote device 210. For example, hypervisor 224-4 may receive data from remote device 210 via a physical RBR. In this case, hypervisor 224-4 may read data from the physical RBR, and may write data to a variable associated with a variable address that is mapped to a register address of the physical RBR (e.g., using mapping information).

In some implementations, virtual machine 224-2 may read data from the variable after hypervisor 224-4 writes the data to the variable. Alternatively, hypervisor 224-4 may write data to a virtual RBR that includes a register address that is mapped to the variable address of the variable. In some implementations, hypervisor 224-4 may prevent hypervisor 224-4 from processing the data that is received via the physical RBR associated with the physical UART port of host platform 220.

In this way, hypervisor 224-4 may enable remote debugging of virtual machine 224-2 by permitting data to pass through to virtual machine 224-2. Additionally, in this way, hypervisor 224-4 reduces communication errors, device errors, and/or the like, by preventing hypervisor 224-4 from processing data that is received via the RBR. Thereby, some implementations described herein conserve processor and/or memory resources of host platform 220 and/or conserve network resources.

In some implementations, hypervisor 224-4 may permit virtual machine 224-2 to transmit data to remote device 210. For example, virtual machine 224-2 may write data, that is to be provided to remote device 210, to a virtual THR. Alternatively, virtual machine 224-2 may write data to a variable that includes a variable address that is mapped to a register address of the virtual THR.

In some implementations, hypervisor 224-4 may receive information identifying an update to a variable that includes a variable address that is mapped to a register address of the virtual THR. In some implementations, hypervisor 224-4 may write data to a physical THR that includes a register address that is mapped to the variable address (e.g., using mapping information). In this way, virtual machine 224-2 may transmit data to remote device 210 using a physical UART port of host platform 220.

In some implementations, hypervisor 224-4 may receive, from virtual machine 224-2, information that updates a physical IER. For example, virtual machine 224-2 may write data to a virtual IER. Additionally, or alternatively, virtual machine 224-2 may write data to a variable that includes a variable address that is mapped to a register address of the virtual IER. Additionally, or alternatively, hypervisor 224-4 may identify an update to the variable, and may write data to the physical IER that includes a register address that is mapped to the variable address (e.g., using mapping information). In this way, virtual machine 224-2 may configure settings associated with the physical IER of host platform 220.

In some implementations, the hypervisor of host platform 220 may receive an interrupt that was generated by the physical UART. For example, hypervisor 224-4 may receive information associated with a received data available interrupt, a THR empty interrupt, a receiver line status interrupt, a modem status interrupt, and/or the like. In some implementations, hypervisor 224-4 may provide information associated with the interrupt to virtual machine 224-2 based on operating in virtual machine mode. In this way, virtual machine 224-2 may receive information associated with the interrupt, and may identify an underlying event that caused the generation of the interrupt by reading data from a register, as described below.

In some implementations, hypervisor 224-4 may identify an update to one or more physical registers (e.g., the MSR, LSR, LCR, etc.). For example, the physical UART may update a physical register based on an underlying event (e.g., data received, line status updated, connection status updated, and/or the like). In some implementations, hypervisor 224-4 may write data, associated with an update to a physical register, to a variable that includes a variable address that is mapped to a register address of the physical register. Alternatively, hypervisor 224-4 may write data to a virtual register that includes a register address that is mapped to the variable.

In some implementations, virtual machine 224-2 may read data from the variable. Additionally, or alternatively, virtual machine 224-2 may receive an update to a virtual register based on hypervisor 224-4 writing the data to the virtual register. In this way, the virtual machine of host platform 220 may identify an underlying event that caused the physical UART, associated with the physical port of host platform 220, to generate an interrupt. In this way, security of virtual machine 224-2 is improved by enabling virtual machine 224-2 to identify underlying events associated with interrupts, and perform actions based on the underlying events (e.g., log out of a session, deny access, and/or the like).

Some implementations described herein provide a hypervisor 224-4 that may operate in a set of modes (e.g., a hypervisor mode or a virtual machine mode). In the virtual machine mode, hypervisor 224-4 may permit virtual machine 224-2 to communicate with remote device 210 using a physical UART port of host platform 220. Additionally, in the virtual machine mode, hypervisor 224-4 may prevent hypervisor 224-4 from processing data received from remote device 210, from writing data generated by hypervisor 224-4 to physical registers of host platform 220, and/or the like. In this way, some implementations described herein reduce communication issues, reduce device operation errors, and/or the like, thereby conserving processor and/or memory resources of host platform 220.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive, by a hypervisor of the device, information that sets a universal asynchronous receiver/transmitter (UART) mode to a virtual machine mode;
map, by the hypervisor of the device, a set of first register addresses, associated with a physical UART port of the device, and a set of variable addresses that is associated with a set of variables, based on receiving the information that sets the UART mode to the virtual machine mode;
map, by the hypervisor of the device, a set of second register addresses, associated with a virtual UART port of a virtual machine of the device, and the set of variable addresses after mapping the set of first register addresses and the set of variable addresses; and
permit, by the hypervisor of the device, the virtual machine to communicate, with a remote device, using the physical UART port based on mapping the set of second register addresses and the set of variable addresses.

2. The device of claim 1, where the one or more processors are further to:
receive, from the remote device and via a register associated with the physical UART port, data that is to be provided to the virtual machine of the device;
update a variable, of the set of variables, that includes a variable address, of the set of variable addresses, that is mapped to a register address, of the set of first register addresses, of the register using the data; and
where the one or more processors, when permitting the virtual machine to communicate with the remote device, are to:
permit the virtual machine to communicate with the remote device based on updating the variable using the data.

3. The device of claim 1, where the one or more processors are further to:
receive information that identifies an update to a variable, of the set of variables, that includes a variable address, of the set of variable addresses, that is mapped to a register address, of the set of first register addresses, of a register associated with the physical UART port;
write data, that corresponds to the update to the variable, to the register associated with the physical UART port after receiving the information that identifies the update to the variable; and
where the one or more processors, when permitting the virtual machine to communicate with the remote device, are to:
permit the virtual machine to communicate with the remote device based on writing the data to the register.

4. The device of claim 1, where the one or more processors are further to:
receive, by the hypervisor of the device, an interrupt that was generated by a UART associated with the physical UART port; and
provide, by the hypervisor and to the virtual machine, information that identifies the interrupt.

5. The device of claim 1, where the one or more processors are further to:
receive information that identifies an update to a register associated with the physical UART port; and
update a variable, of the set of variables, that includes a variable address, of the set of variable addresses, that is mapped to a register address, of the set of first register addresses, of the register to permit the virtual machine to identify the information that identifies the update to the register.

6. The device of claim 1, where the one or more processors are further to:
receive information that identifies an update to a variable, of the set of variables, that includes a variable address, of the set of variable addresses, that is mapped to a register address, of the set of first register addresses, of a register associated with the physical UART port; and
update the register based on the information that identifies the update to the variable to permit the virtual machine to configure a setting associated with the register.

7. The device of claim 1, where the one or more processors are further to:
receive, by the hypervisor of the device, information that identifies the virtual machine,
the device being associated with a set of virtual machines, and
the set of virtual machines including the virtual machine; and
where the one or more processors, when mapping the set of first register addresses and the set of variable addresses, are to:
map the set of first register addresses and the set of variable addresses based on the information that identifies the virtual machine,
the set of variable addresses being associated with the virtual machine of the set of virtual machines.

8. A non-transitory computer-readable medium storing instructions, the instructions comprising:
one or more instructions that, when executed by one or more processors of a device, cause the one or more processors to:
receive, by a hypervisor of the device, information that identifies that a virtual machine of the device is to use an asynchronous receiver/transmitter (UART) of the device;
map, by the hypervisor of the device, a set of first register addresses, associated with a physical UART port of the device, and a set of variable addresses that is associated with a set of variables based on receiving the information that identifies that the virtual machine is to use the UART of the device;
map, by the hypervisor of the device, a set of second register addresses, associated with a virtual UART port of the virtual machine of the device, and the set of variable addresses after mapping the set of first register addresses and the set of variable addresses; and
permit, by the hypervisor of the device, the virtual machine to communicate, with a remote device, using the physical UART port based on mapping the set of second register addresses and the set of variable addresses.

9. The non-transitory computer-readable medium of claim 8, where the one or more instructions, when executed by the one or more processors, further cause the one or more processors to:
receive, from the remote device and via the physical UART port, data that is to be provided to the virtual machine;
provide, by the hypervisor and to the virtual machine, the data,
the hypervisor to provide the data without having processed the data; and
where the one or more instructions, that cause the one or more processors to permit the virtual machine to communicate with the remote device, cause the one or more processors to:
permit the virtual machine to communicate with the remote device based on providing the data to the virtual machine.

10. The non-transitory computer-readable medium of claim 8, where the one or more instructions, when executed by the one or more processors, further cause the one or more processors to:
receive, by the hypervisor and from the virtual machine, data that is to be provided to the remote device;
provide, by the hypervisor and via the physical UART port, the data to the remote device; and where the one or more instructions, that cause the one or more processors to permit the virtual machine to communicate with the remote device, cause the one or more processors to:
permit the virtual machine to communicate with the remote device based on providing the data to the remote device.

11. The non-transitory computer-readable medium of claim 8, where the one or more instructions, when executed by the one or more processors, further cause the one or more processors to:
receive, by the hypervisor, information associated with an interrupt associated with the physical UART port; and
provide, by the hypervisor and to the virtual machine, the information associated with the interrupt.

12. The non-transitory computer-readable medium of claim 8, where the one or more instructions, when executed by the one or more processors, further cause the one or more processors to:
receive, by the hypervisor and from the virtual machine, information that identifies that a register of the physical UART port is to be updated; and
update, by the hypervisor, the register based on the information that identifies that the register of the physical UART port is to be updated.

13. The non-transitory computer-readable medium of claim 8, where the one or more instructions, when executed by the one or more processors, further cause the one or more processors to:
set, by the hypervisor, a mode of operation to a virtual machine mode after receiving the information that identifies that the virtual machine of the device is to use the UART of the device; and
where the one or more instructions, that cause the one or more processors to permit the virtual machine to communicate with the remote device, cause the one or more processors to:
permit the virtual machine to communicate with the remote device based on setting the mode of operation.

14. The non-transitory computer-readable medium of claim 8, where the one or more instructions, when executed by the one or more processors, further cause the one or more processors to:
receive information that identifies the virtual machine, the device including a set of virtual machines, and the set of virtual machines including the virtual machine; and
where the one or more processors, that cause the one or more processor to permit the virtual machine to communicate with the remote device, cause the one or more processors to:
permit the virtual machine to communicate with the remote device using the information that identifies the virtual machine.

15. A method, comprising:
receiving, by a hypervisor of a device, information that identifies that a virtual machine of the device is to use a universal asynchronous receiver/transmitter (UART) of the device;
mapping, by the hypervisor of the device, a set of first register addresses, associated with a physical UART port of the device, and a set of variable addresses that is associated with a set of variables, based on receiving the information that identifies that the virtual machine is to use the UART of the device;
mapping, by the hypervisor of the device, a set of second register addresses, associated with a virtual UART port of the virtual machine of the device, and the set of variable addresses after mapping the set of first register addresses and the set of variable addresses; and
permitting, by the hypervisor of the device, the virtual machine to communicate, with a remote device, using the physical UART port based on mapping the set of second register addresses and the set of variable addresses.

16. The method of claim 15, further comprising:
setting a mode of operation to a virtual machine mode after receiving the information that identifies that the virtual machine is to use the UART of the device; and
where permitting the virtual machine to communicate with the remote device comprises:
permitting the virtual machine to communicate with the remote device based on setting the mode of operation to the virtual machine mode.

17. The method of claim 15, further comprising:
receiving, by the hypervisor and from the remote device, data that is to be provided to the virtual machine;
providing, by the hypervisor and to the virtual machine, the data after receiving the data; and
where permitting the virtual machine to communicate with the remote device comprises:
permitting the virtual machine to communicate with the remote device based on providing the data to the virtual machine.

18. The method of claim 15, further comprising:
receiving, by the hypervisor and from the virtual machine, data that is to be provided to the remote device;
providing, by the hypervisor and to the remote device, the data after receiving the data; and
where permitting the virtual machine to communicate with the remote device comprises:
permitting the virtual machine to communicate with the remote device based on providing the data to the remote device.

19. The method of claim 15, further comprising:
receiving, by the hypervisor, information that identifies an interrupt associated with the physical UART port; and
providing, by the hypervisor and to the virtual machine, the information that identifies the interrupt associated with the physical UART port.

20. The method of claim 15, further comprising:
receiving information that identifies the virtual machine, the device including a set of virtual machines, and the set of virtual machines including the virtual machine; and
where permitting the virtual machine to communicate with the remote device comprises:
permitting the virtual machine to communicate with the remote device after receiving the information that identifies the virtual machine.

* * * * *